Figure 1:
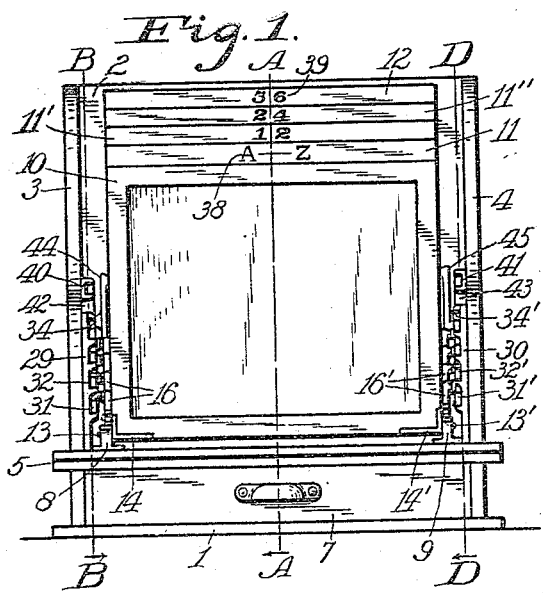

E. T. SILVIUS.
FILING APPLIANCE.
APPLICATION FILED MAY 11, 1914.

1,244,906.

Patented Oct. 30, 1917.
3 SHEETS—SHEET 1.

WITNESSES:
J. H. Gardner
M. E. Sparrow

INVENTOR.
Ellis T. Silvius

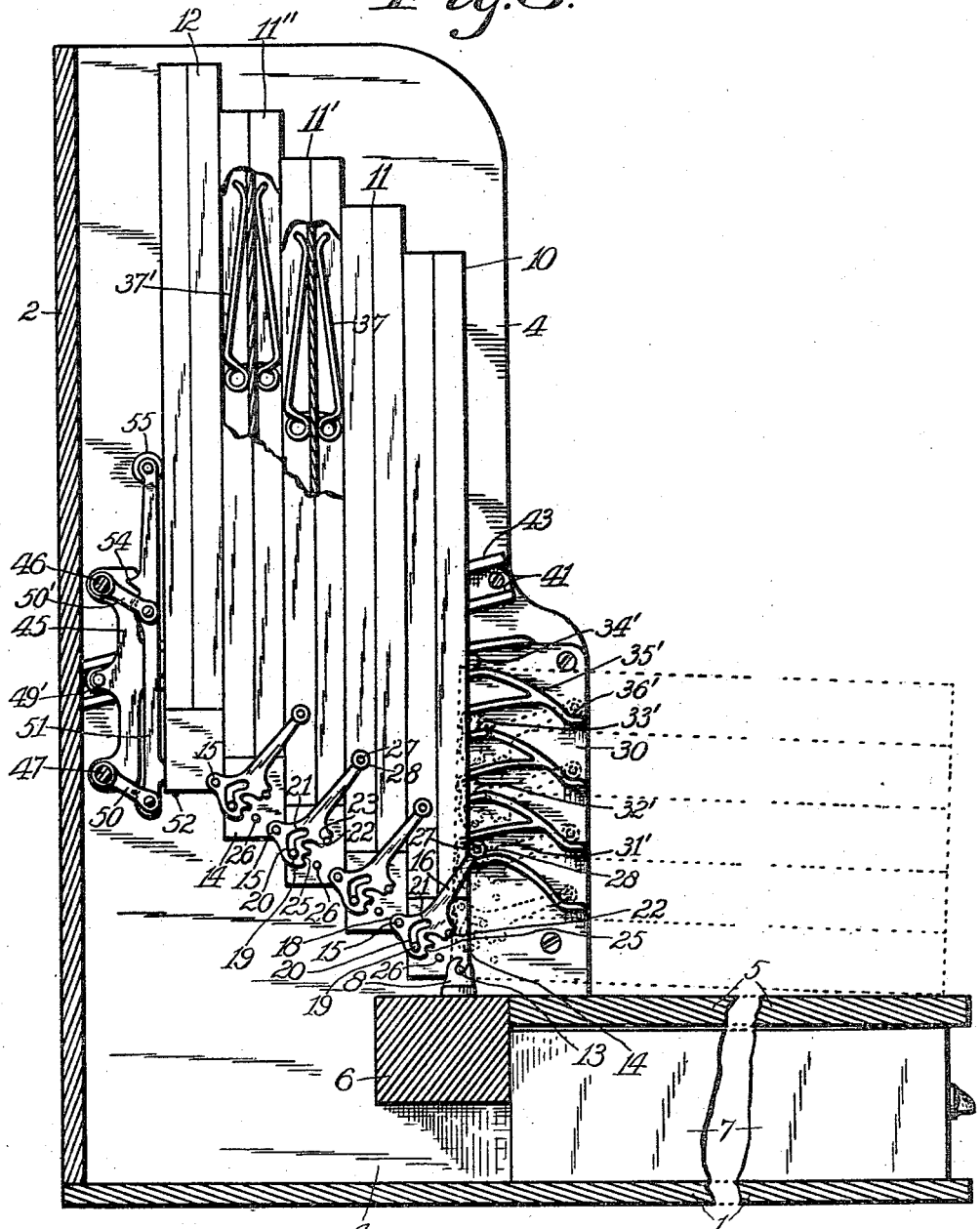

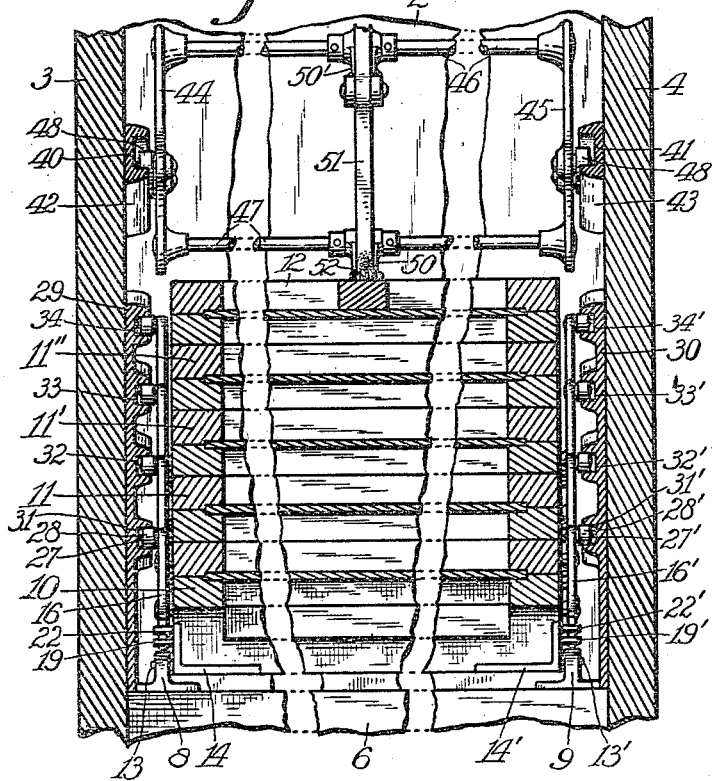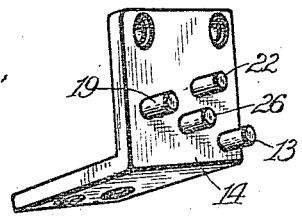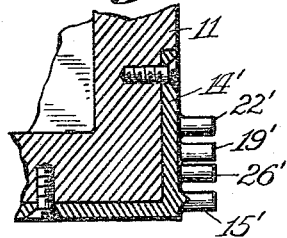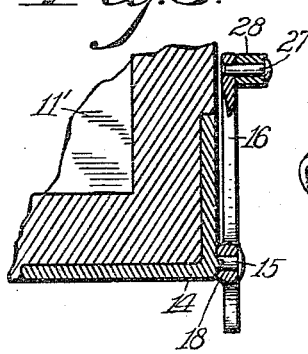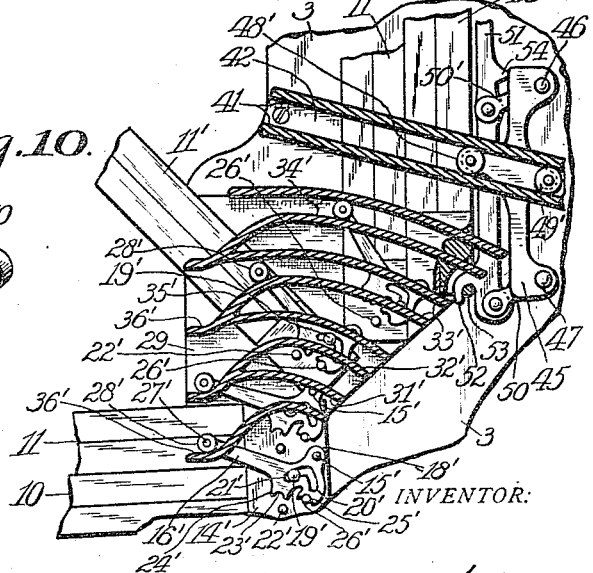

UNITED STATES PATENT OFFICE.

ELLIS T. SILVIUS, OF INDIANAPOLIS, INDIANA, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,244,906.

Specification of Letters Patent.

Patented Oct. 30, 1917.

Application filed May 11, 1914. Serial No. 837,864.

*To all whom it may concern:*

Be it known that I, ELLIS T. SILVIUS, a citizen of the United States, residing at Indianapolis, in the county of Marion and State of Indiana, have invented a new and useful Filing Appliance, of which the following is a specification, reference being had to the accompanying drawings and to the letters and figures of reference marked thereon.

The invention relates to cabinets or appliances wherein commercial or other papers may be conveniently placed and retained or filed in systematic order, more especially bill or sale slips comprising parts of credit systems, the invention having reference more particularly to frames or leaves for holding the papers, and means for connecting the frames or leaves together to permit them to normally stand uprightly or to lie in prone position, the invention having reference also to means for controlling the frames or leaves and the connecting devices thereof.

An object of the invention is to provide improved connections for filing frames or leaves that shall be so constructed that the frames or leaves shall not be unyieldingly connected together, but shall be permitted to shift longitudinally so as to be arranged in echelon or stepped order when in normal position and to form a rectangular pack when in prone position, which connections shall permit of the connected leaves being readily placed in a casing or removed therefrom and without requiring cumbersome attachments to be carried with the frames or leaves when removed from their casing. A further object of the invention is to provide connections for the frames or leaves of relatively inexpensive and simple form, and which shall permit of the required adjustability of the frames or leaves during pivotal movement thereof. A still further object is to provide hinging or pivoting connections of the shiftable or adjustable type for the frames or leaves of filing appliances which shall be adapted to be easily controlled in operation, and to provide improved controlling means for the hinging or connecting devices, and simple means for maintaining the frames or leaves vertically when in normal upright position.

With the above-mentioned and other objects in view, the invention consists in a plurality of improved filing frames or leaves having novel devices thereon with which novel shifting devices coöperate for adjustably connecting the leaves together for relative pivotal and also longitudinal movement, and improved means for controlling the connecting devices. The invention consists further in the parts, and in the combinations and arrangements of parts, as hereinafter particularly described and further defined in the accompanying claims.

Figure 2:
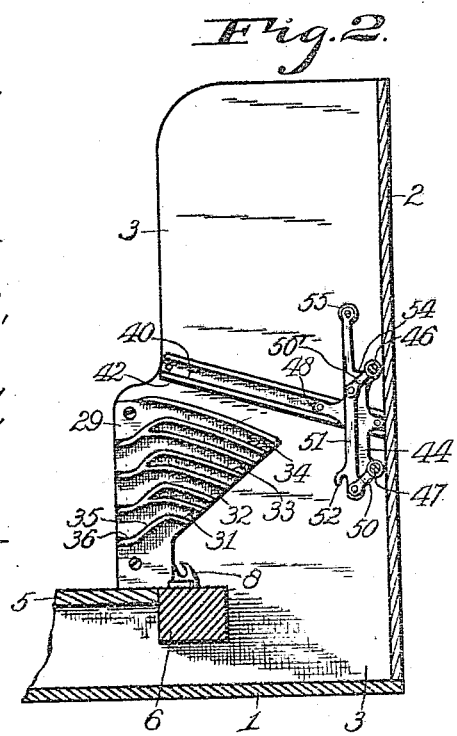
Figure 3:
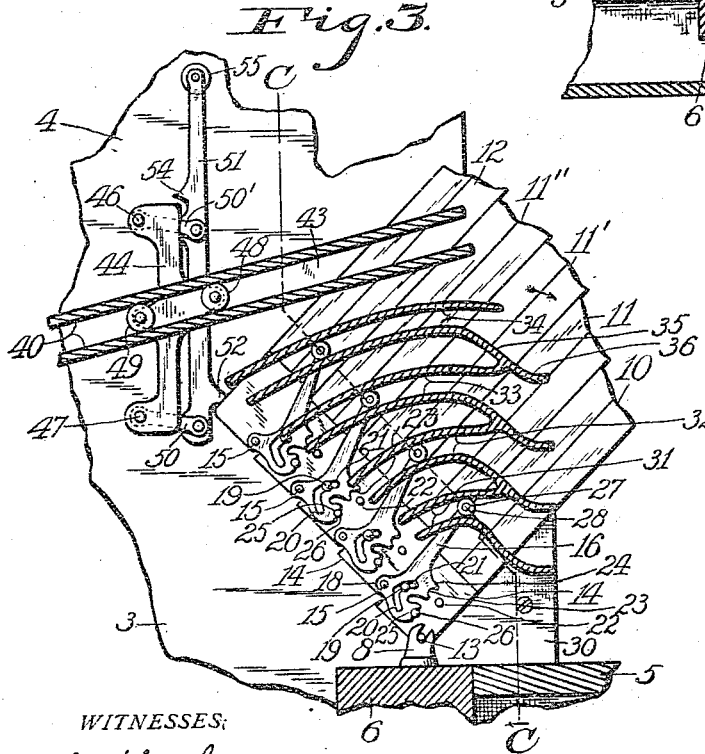
Figure 4:
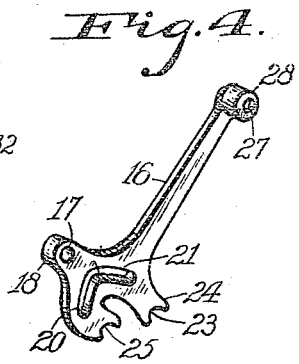

Referring to the drawings, Figure 1 is a front elevation of the improved filing or credit account register constructed substantially in accordance with the invention; Fig. 2, a section of the casing partially broken away approximately on the line A A in Fig. 1 minus the filing frames or leaves; Fig. 3, a fragmentary section on the line B B in Fig. 1 showing the filing frames or leaves in different positions, as when being moved together from normal to prone position; Fig. 4, a perspective view of one of the connecting and controlling devices of the frames or leaves; Fig. 5, a section approximately on the line A A in Fig. 1, the frames or leaves being in elevation; Fig. 6, a section approximately on the line C C in Fig. 3, but partially broken away; Fig. 7, a perspective view of one of the connecting devices with which the frames or leaves are preferably provided; Fig. 8, a fragmentary section of one of the frames or leaves looking rearward; Fig. 9, a fragmentary section of one of the frames or leaves looking forward; Fig. 10, a perspective view of one of the links of the improved equalizing appliances or movable abutments whereby the frames are maintained vertically, and Fig. 11 is a fragmentary section showing the frames or leaves in various positions taken on the line D D in Fig. 1.

Similar reference characters in the different figures of the drawings indicate corresponding elements or features of construction herein referred to and described in detail.

A practical embodiment of the invention comprises a suitable support, preferably formed as a casing which with the frames or leaves forms a filing cabinet, a suitable casing structure comprising a bottom 1, a back 2 on the rear end of the bottom, and sides 3 and 4 connected to the bottom and the back, the forward portions of the sides being relatively low to form a desk-like part having a top 5, the latter serving to support the frames or leaves in prone position, a rail or foundation 6 being suitably supported at the rear end of the top 4 normally supporting the frames or leaves. The desk-like portion of the casing may be conveniently provided with a drawer 7. The casing may be variously modified as may be desired. The rail or foundation 6 is provided with two suitable pivot bearings 8 and 9 for pivotally supporting a complete set of filing frames or leaves, there being a front frame 10, a suitable number of intermediate frames 11, 11′, 11″, and a rear frame 12, all being similar in construction generally or may be variously modified to conform to filing requirements.

The front frame 10 is provided on opposite sides near the normal lower forward portion thereof with a pair of pivots or trunnions 13 and 13′ that are removably connected to the pivot bearings 8 and 9, the pivots preferably being formed integrally on angle corner pieces 14 and 14′, respectively, suitably secured to the lower corners of the frames or leaves, so that the frames or leaves may be made substantially alike, each one of the remaining frames or leaves being provided with similar pivots or trunnions 15 and 15′ on the lower forward portions of opposite sides thereof, respectively, to serve to connect the leaves together. A pair of devices of novel form are provided for loosely connecting two adjacent ones of the frames together for relatively pivotal and also longitudinal movement, the devices constituting also controlling levers and comprising arms 16 and 16′, respectively, each having a pivot hole 17 preferably formed in a lateral projection 18 adjacent to one end of the arm, whereby the devices are connected to the pivots 15 and 15′ of one frame or leaf, the major portion of the devices extending adjacent to the opposite sides of the next adjacent forward frame or leaf. Each one of the frames or leaves excepting the rear leaf 12 is provided with guide studs 19 and 19′ on opposite sides thereof respectively, the studs being adjacent to the rear portion of the leaf and farther upward than the pivots or trunnions, and they extend through guideways or slots formed in the controlling devices or levers and each guideway is approximately L-shaped, so that there are branches 20 and 20′ that normally are nearly or approximately vertical and connecting branches 21 and 21′ that extend forwardly and upwardly from the approximately vertical branches when the frames or leaves are in normal position, and the studs are in the lower ends of the vertical branches of the slots when the leaves are upright and in the connecting branches when the leaves are in prone position, the studs being shifted in the slots during movement of the leaves between upright and prone position, or vice versa. The opposite sides of each one excepting the rear frame are provided also with projecting pivotal studs 22 and 22′ respectively that are arranged farther upward on the leaves than the guide studs and relatively nearer to the forward face of the frame or leaf, to be periodically engaged by concave pivot seats 23 and 23′ formed on the forward portion of the controlling devices at a suitable distance from the pivots 15 and 15′ respectively, the seats preferably being formed in lateral projections 24 and 24′ respectively, formed on the devices so as to constitute levers which have also other pivot seats or bearings 25 and 25′ respectively that are periodically seated on pivot studs 26 and 26′ formed on opposite sides respectively of each one excepting the rear leaf approximately midway between the front and rear faces of the leaf and farther down on the leaf than the guide studs 19 and 19′. The levers normally are in contact with the pivot studs 22 and 22′, but when the frames are in prone position are in contact with the pivot studs 26 and 26′ respectively, the points of contact changing during pivotal movement of the frames, while the guide studs moving in their guideways permit relatively longitudinal movement of the frames or leaves. The opposite ends of the arms of the levers are provided with lateral wrist pins 27 and 27′ respectively which preferably are provided with rollers 28, 28′, for smoothly guiding the operations of the connecting and controlling devices.

For the purpose of controlling the frames or leaves and the movements thereof, a pair of guide plates 29 and 30 are suitably secured to the inner faces of the sides 3 and 4 respectively and are provided with a suitable number of guideways for the rollers or wrist pins of the controlling levers, one plate having curved guideways 31, 32, 33 and 34 in which the rollers 28 are guided, the companion plate having guideways 31′, 32′, 33′ and 34′ in which the rollers 28′ are guided. The curvature of the different guideways varies so as to permit free action of the several controlling levers whether all the leaves are moved together on the pivots of the front leaf or on the pivots of other leaves, and the lower walls of the guideways have downwardly extending forward portions 35, 35′, that extend past the forward ends of the upper walls and from which extend reversely curved portions 36, 36′, on which the guide rollers are guided when the frames are in prone position, so that at the forward ends of the plates the guideways have increased space between the upper and lower walls thereof which permits the pack of leaves in prone position to be readily connected to or disconnected from the pivot bearings 8 and 9 without the rollers of the controlling levers interfering with the upper walls of their guideways.

The frames or leaves are provided with suitable clamps 37, 37', or other suitable devices whereby papers may be removably secured to the frames or leaves, the upper forward portions of the latter being provided with indexing letters 38 or numerals 39 as may be desired, so that one may readily find certain papers contained in the filing cabinet or register.

The inner faces of the sides 3 and 4 are provided with a pair of channel guideways 40 and 41 formed in plates 42 and 43 respectively which are secured to the sides and extend upwardly from the back 2 of the casing for guiding a movable abutment or equalizer which preferably comprises two side members 44 and 45 secured to two cross-bars 46 and 47, one member being provided with supporting rollers 48 and 49 that are guided in the guideway 40, the opposite member being provided with similar rollers 48' and 49' that are guided in the guideways 41. Two links 50 and 50' are pivotally connected to the cross-bars 47 and 46 respectively and carry a back-rest 51 which is pivotally connected to suitable jaws on the ends of the links. The lower forward portion of the back-rest is provided with a hook 52 which normally engages a pivot 53 with which the lower rear portion of the frame or leaf 12 is provided, the rear portion of the rest 51 preferably having a finger 54 thereon adapted to engage the link 50' to support the back-rest when disconnected from the rear leaf, the upper portion of the back-rest being provided with a roller 55 that is normally in contact with the back of the rear frame or leaf. The rear leaf normally supports the back rest and controls its movement on its connecting links during pivotal movement of the frames or leaves.

In practical use the papers required to be filed are placed upon and retained by the filing frames or leaves so as to be accessible, additional papers being added to the papers as occasion may require. One or more of the frames may readily be drawn forward to prone position to gain access to the papers, or the entire set of frames may be drawn forward together to prone position after which the group of frames in a rectangular pack may readily be lifted from the pivot bearings 8 and 9 after having disconnected the hook 52 from the pivot 53, the abutment being permitted to roll away to the back 2 of the casing. During pivotal movement of the frames from upright to prone position, while the controlling levers are guided by their guides the guide studs 19, 19', and the pivot studs adjacent thereto on the frames are shifted relatively to the pivots 15, 15', so that the frames are permitted to move downward relatively to the adjacent forward frames, as seen in Figs. 3 and 11, and therefore when the frames assume the prone position their normal lower ends are on one and the same plane, there being no obstructing elements projecting beyond such plane, and therefore the pack of frames may be set uprightly on their own bottoms in a fireproof safe or elsewhere without requiring a specially designed or other form of holder. When it is desired to return the pack of frames to the casing, the pivots 13 and 13' are readily placed upon the bearings 8 and 9 respectively, after which the abutment is drawn forward, the back-rest 51 being slightly lifted while the hook 52 is being connected to the pivot 53, after which the set of frames is moved upward to upright position and so remain, as seen more particularly in Figs. 1 and 5, each frame behind the foremost one being supported by means of its piots 15 and 15' and the levers on the pivot studs 22 and 22' of the next adjacent forward frame, the guide studs 19 and 19' preventing the lower ends of the frames from being drawn apart to any appreciable extent, so that the pivot bearings 23 cannot accidentally slide from the pivot studs 22, the arms 16 of the controlling levers being retained in the proper position by the stationary guideways on the sides of the casing. By reference to Fig. 11 the specific action of the different elements of the connections of the frames will be readily understood, the position of the frame 11' being between the upright and prone positions when the change of contact as between the pivotal studs 22' and 26' is taking place. Other results of the operation of the various elements of the invention will be readily understood from the detailed description of the construction and function thereof without requiring further description.

Having thus described the invention, what is claimed as new is—

1. A filing appliance including two adjacent filing frames one of which is pivotally supported, a controlling lever movably pivoted to the pivotally supported frame and fixedly pivoted to the other of said frames, and means for guiding the controlling lever.

2. A filing appliance including a plurality of filing frames normally mounted uprightly in echelon, and a plurality of connecting devices carried by and each pivotally connected to one of the frames and having slotted connection with an adjacent one of the frames for permitting relative longitudinal movement of the frames as they are operated from upright to reclined position and vice versa.

3. A filing appliance including a plurality of filing frames normally mounted uprightly in echelon, and a plurality of connecting devices carried by and each pivotally connected to one frame and having slotted pivotal connection with an adjacent one of the frames for permitting relative longitudinal movement of the frames as they are operated from upright to reclined position and vice versa.

4. A filing appliance including a plurality of filing frames, a plurality of controlling levers each pivotally connected to one of the frames and having slotted connection with an adjacent one of the frames, and means for guiding the controlling levers.

5. A filing appliance including a filing frame provided with a guide stud, a controlling lever having shifting pivotal connection with and guided by the stud, a filing frame pivotally connected to the controlling lever and means for guiding the controlling lever.

6. A filing appliance including a plurality of filing frames and means connecting and pivotally supporting the frames uprightly in echelon including devices each movably pivoted to one and fixedly pivoted to an adjacent one of the frames, permitting relative pivotal and also longitudinal movement of the frames as they are operated from upright to reclined position and vice versa.

7. A filing appliance including a plurality of filing frames, and a plurality of connecting devices each pivotally connected to one frame and having slotted pivotal connection with an adjacent one of the frames, each device having a controlling arm thereon, and means for guiding the controlling arm.

8. A filing appliance including a plurality of filing frames, one of the frames being pivotally supported and provided with a guide stud, a controlling lever having a guide slot receiving the guide stud, the lever being pivotally connected with the adjacent one of the frames, and means for guiding the controlling levers.

9. A filing appliance including a case, a plurality of filing frames, one of the frames being pivotally supported in the case and provided with two pivot devices, a controlling lever on the frame pivotally connected with the adjacent one of the frames and having contact with one of the pivot devices, and means in the case for guiding the lever from one to the other of the pivot devices during pivotal movement of the frames.

10. A filing appliance including a filing frame provided with two pivot studs and also a guide stud, a controlling lever having a guide slot and also two pivot seats, the slot receiving the guide stud whereby the lever may be guided to carry one pivot seat from one of the pivot studs and the other pivot seat to the other pivot stud, means for guiding the controlling lever and a filing frame pivoted to the lever.

11. A filing appliance including a plurality of filing frames, one of the frames having two pivot studs thereon and also a controlling lever adapted to be moved to and have pivotal contact with either one of the studs, means for pivotally and slidingly guiding the lever to or from the studs during the operation of the frame, the adjacent one of the frames being pivoted to and normally supported by the lever.

12. A filing appliance including a casing, a plurality of frames uprightly arranged in the casing, the foremost one of the frames being pivotally supported, a plurality of reversely curved guides supported in the casing, and means for connecting the frames together to move pivotally and also longitudinally one to another and having arms movably guided by the guides respectively.

13. A filing appliance including a casing, a plurality of filing frames uprightly arranged in the casing, pivots supporting the foremost one of the frames, guides mounted in the casing, and controlling levers on all except the rearmost frame having shifting pivotal connection with the frames by which they are supported and having also movable contact with the guides, the levers being pivoted to and directly supporting the rearward adjacent frames.

14. A filing appliance including a plurality of frames, all excepting the foremost one having supporting and controlling devices having fixed pivotal connection therewith, each one excepting the rearmost one of the frames being slidably pivoted to the devices of the forward adjacent frames, means for pivotally supporting the foremost one of the frames, and means for variably guiding the supporting and controlling devices during movement of the frames.

15. A filing appliance including a casing, a plurality of frames uprightly arranged in the casing, the foremost frame being pivotally supported, the forward adjacent frames having controlling devices pivotally and slidingly mounted thereon and the rearward adjacent frames being pivoted to the devices, and means mounted in the casing with which the controlling devices coöperate for assisting the devices to support the frames.

16. A filing appliance including a case and a plurality of filing frames, and means for connecting each two adjacent frames together and operatively supporting them in the case, including a device carried by and having shifting pivotal connection with the forward frame and having fixed pivotal connection with the rearward adjacent frame.

17. A filing appliance including a case having guideways therein, a plurality of filing frames uprightly arranged face to face, a plurality of supporting and controlling levers engaging the guideways and pivoted to the frames excepting the foremost one and having movably guided pivotal connection with the next adjacent forward frames, the adjacent forward frames being provided with separate pivotal devices to be alternatively engaged by the levers, and means for pivotally supporting the foremost one of the frames.

18. A filing appliance including a casing comprising sides having guideways thereon, each guideway having an upper curved wall and a lower curved wall, the lower wall having a downwardly curved forward portion extending away from the upper wall, a plurality of filing frames uprightly arranged in the casing, the foremost one of the frames being pivotally supported, and a plurality of controlling levers pivotally connecting the frames together for relative longitudinal movement and having wrist-pins thereon normally guided in the guideways, each lever being adjustably supported on the forward one and pivoted to the rearward one of two adjacent frames.

19. In a filing appliance, the combination of a plurality of filing frames, one of the frames having two pivot studs thereon, the adjacent one of the frames being provided with a pivot, a connecting device connected to the pivot and having two pivot seats adapted to have pivotal contact with the pivot studs respectively, means between the pivot studs and the pivot of the adjacent frame for movably connecting the device to the first described one of the frames and permitting the contact of the pivot seats separately with the pivot studs and means for guiding the devices from one pivotal stud to the other.

20. In a filing appliance, the combination of a plurality of filing frames, one of the frames having a guide stud and also two pivot devices thereon, a connecting device pivoted to the adjacent frame and having a slot therein comprising two diverging branches, the slot receiving the guide stud and movably connecting the connecting device to the frame, the connecting device being adapted to have pivotal contact with either one of the two pivot devices and means for guiding the connecting devices from one pivotal stud to the other.

In testimony whereof, I affix my signature in presence of two witnesses.

ELLIS T. SILVIUS.

Witnesses:
J. H. GARDNER,
M. E. SPARROW.

Copies of this patent may be obtained for five cents each, by addressing the "Commissioner of Patents, Washington, D. C."